(12) United States Patent
Vidal-de-Miguel

(10) Patent No.: US 11,075,068 B2
(45) Date of Patent: Jul. 27, 2021

(54) ION SOURCE FOR ANALYSIS OF LOW VOLATILITY SPECIES IN THE GAS PHASE

(71) Applicant: FOSSIL ION TECHNOLOGY, Madrid (ES)

(72) Inventor: Guillermo Vidal-de-Miguel, Madrid (ES)

(73) Assignee: FOSSIL ION TECHNOLOGY, Madrid (ES)

( * ) Notice: Subject to any disclaimer, the term of this patent is extended or adjusted under 35 U.S.C. 154(b) by 0 days.

(21) Appl. No.: 16/764,989

(22) PCT Filed: Nov. 20, 2017

(86) PCT No.: PCT/IB2017/057255
§ 371 (c)(1),
(2) Date: May 18, 2020

(87) PCT Pub. No.: WO2019/097283
PCT Pub. Date: May 23, 2019

(65) Prior Publication Data
US 2020/0411303 A1    Dec. 31, 2020

(51) Int. Cl.
*H01J 49/00* (2006.01)
*H01J 49/16* (2006.01)
(Continued)

(52) U.S. Cl.
CPC .......... *H01J 49/165* (2013.01); *G01N 27/622* (2013.01); *H01J 49/025* (2013.01); *H01J 49/0422* (2013.01); *H01J 49/145* (2013.01)

(58) Field of Classification Search
CPC .... H01J 49/165; H01J 49/025; H01J 49/0422; H01J 49/145; G01N 27/622
(Continued)

(56) References Cited

U.S. PATENT DOCUMENTS

| 4,167,667 A * | 9/1979 | Hall ..................... G01N 33/497 |
| | | 128/205.12 |
| 8,217,342 B2 | 7/2012 | Vidal-de-Miguel |

(Continued)

OTHER PUBLICATIONS

International Search Report from PCT Application No. PCT/IB2017/057255, dated Aug. 10, 2018.
(Continued)

*Primary Examiner* — Michael Maskell
(74) *Attorney, Agent, or Firm* — Budzyn IP Law, LLC

(57) ABSTRACT

A method and apparatus that ionize vapors for their chemical analysis is described. The new ionizer improves the ionization efficiency by reducing dilution of sample molecules and improving transmission of ions to the analyzer. This is accomplished by a new flow configuration, in which a stream of clean gas focuses the ions towards the analyzer. A deflector prevents the formation of turbulent perturbation, and the ionization maintains a laminar regime without the need for additional separating walls or electrodes. The flow within the ionizer is configured so that contaminants released by the inner walls of the ionizer do not reach the ionization region. The resulting ionizer improves the ionization efficiency, and the background levels for low volatility species. This makes it ideal for the analysis of low volatility species in the gas phase. One application of this ionizer is the analysis of human breath in real time.

10 Claims, 7 Drawing Sheets

(51) Int. Cl.
*G01N 27/622* (2021.01)
*H01J 49/02* (2006.01)
*H01J 49/04* (2006.01)
*H01J 49/14* (2006.01)

(58) Field of Classification Search
USPC ................................. 250/281, 282, 288
See application file for complete search history.

(56) References Cited

U.S. PATENT DOCUMENTS

| | | | |
|---|---|---|---|
| 8,461,523 | B2 | 6/2013 | Vidal-de-Miguel |
| 9,297,785 | B2 | 3/2016 | Amo et al. |
| 2004/0094706 | A1 | 5/2004 | Covey et al. |
| 2010/0176290 | A1* | 7/2010 | Vidal-De-Miguel ........................ H01J 49/0422 250/282 |
| 2010/0264304 | A1 | 10/2010 | Pablo et al. |
| 2011/0174966 | A1 | 7/2011 | Wollnik et al. |
| 2012/0325024 | A1 | 12/2012 | Vidal-de-Miguel et al. |
| 2013/0168548 | A1* | 7/2013 | Wang ..................... A61B 5/082 250/288 |
| 2015/0008313 | A1* | 1/2015 | Loboda ................. H01J 49/164 250/282 |
| 2015/0108347 | A1* | 4/2015 | Vidal de Miguel ........................ G01N 27/622 250/288 |
| 2017/0032949 | A1 | 2/2017 | Covey et al. |

OTHER PUBLICATIONS

César Barrios-Collado, et al., "Numerical modeling and experimental validation of a universal secondary electrospray ionization source for mass spectrometric gas analysis in real-time", Sensors and Actuators B: Chemical: International Journal Devoted to Research and Development F Physical and Chemical Transducers, Sep. 16, 2015, pp. 217-225, vol. 223.

Pervukhin V V, et al., "Vortex jet transport of ions from a source to mass spectrometer input at atmospheric pressure", Technical Physics Letters, Nauka/Interperiodica, MO, Dec. 16, 2012, pp. 1027-1030, vol. 38, No. 11.

* cited by examiner

ION SOURCE FOR ANALYSIS OF LOW VOLATILITY SPECIES IN THE GAS PHASE

CROSS-REFERENCE TO RELATED APPLICATION

This application is a National Stage Filing under 35 U.S.C. § 371 of PCT Application No. PCT/IB2017/057255, filed on Nov. 17, 2017, the entire contents of which are incorporated by reference herein.

TECHNICAL FIELD OF THE INVENTION

The present invention relates to an apparatus and a method to ionize molecules and aerosols in the gas phase for their analysis by an ion analyzer, including mass spectrometers, ion mobility spectrometers, and combinations of the two. In particular, the invention describes a new configuration that improves the ionization efficiency, the background levels, and the stability of the signals produced by molecules with low volatility. This improves the limits of detection and facilitates a quantitative correlation between the measured signals and the concentrations of the molecules in the gas. The new ionizer is particularly well suited for the analysis of breath in real-time.

BACKGROUND ART OF THE INVENTION

The analysis and detection of chemical species in a gas is of interest in many applications. For instance, for detecting hidden explosives or illicit substances, for analyzing the metabolites produced and released into the surrounding gas by cell cultures, tissues, or bodily fluids, for determining microorganism growth, in the food and aroma industries. One interesting application is the diagnosis of health problems by analyzing the chemical composition of breath.

Breath analysis is an application that would greatly benefit from better analyzers. Breath analysis is a non-invasive technique that provides unique access to the respiratory system. For this reason, it is uniquely suited for the rapid and accurate diagnosis of pulmonology diseases, including Chronic Obstructive Pulmonary Disease (COPD), Tuberculosis (TB), Lung Cancer, and other pathologies of the lung. In addition, because it is non-invasive, breath analysis is ideal when more invasive techniques are not recommended. This can be the case of premature newborns, and patients in Intensive Care Units (ICU).

Despite the obvious advantages of breath analysis, only a few breath diagnosis tests are approved by the Food and Drug Administration (FDA). These tests and the corresponding measure biomarkers are capnography ($CO_2$), 13C-urea breath test for the detection of *H. pyroli* infection (isotopically labeled $13CO_2$), test of neonatal jaundice (CO), disaccharide adsorption deficiency and small intestine bacterial overgrowth syndromes ($H_2$ and $CH_4$), monitoring asthma therapy (NO), breath test for heart transplant rejection (Alkanes), 13C-octanoic acid gastric emptying breath test (isotopically labeled $13CO_2$).

All these biomarkers have one property in common: they are very volatile gases. Large molecules and metabolites are more specific and carry more information, which can be used to greatly expand the applications of breath analysis. However, larger molecules are not used because handling and accurately detecting them in breath is technically very challenging. Detecting high volatility species in the gas is commonly achieved with state of the art technology. For an analyzer of molecules to provide biologically relevant information, it is of paramount importance to be able to detect larger molecules, but larger molecules with lower volatilities cannot be detected with sufficient accuracy with state of the art technologies.

One objective of the present invention is to solve this problem so that larger molecules can be detected, and the number of biomarkers used to diagnose disease can be expanded. These molecules tend to have very low vapor pressures, and they are present in the gas and in the air at very low concentrations. As a result, for an analyzer of molecules in the gas phase, the Limit of Detection (LoD), which is defined as the minimum amount of a given species that can be detected by the analyzer, must be very low. In short, reducing the LoD enables the detection of larger and less volatile species in the gas phase.

Currently, the most common analytical method for the analysis and detection of vapors is Gas Chromatography (GC) and Gas Chromatography coupled with Mass Spectrometry (GC-MS). At the cost of introducing a new and time-consuming step, pre-concentration techniques such as Solid-Phase Micro-Extraction (SPME) increase the sensitivity of the GC-MS analysis. However, these methods require long analysis times, which are not compatible with real-time analysis, and their sensitivity is limited by the fact that the GC column can only accept a very small amount of sample.

To study the metabolism of a living system, and its dynamic response, the analyzer must provide a sufficiently rapid response. The temporal resolution required for this is determined by the fastest metabolic change that the system being studied can undergo. For a human, it is well known that drastic changes can occur in a matter of minutes. In one extreme case, if a person stops breathing for a few minutes, its metabolism can change drastically: form alive to death. This shows that a time resolution of at least 30 seconds would be most desirable. For smaller creatures, the time resolution might be higher, and cell cultures can be even faster. GC and GC-MS do not have the required time resolution because the GC requires several minutes for the whole sample to elute.

Ambient Mass Spectrometry (Ambient MS) techniques omit the chromatographic step and ionize the samples directly at ambient pressure. This results in much better time resolutions. The TAGA system (Sciex), which used a corona discharge to ionize the vapors, was one attempt to ionize and analyze vapor samples [1]. By eliminating the GC step, the analysis time in Ambient MS techniques is defined by the MS scan rate, which is typically below 100 ms. In practice, this approach provides an almost instantaneous analysis, which enables online and real-time analysis, and which is ideal to monitor dynamic processes.

Corona based Ambien Mass Spectrometry techniques include the TAGA instrument, but also other ionization techniques, more broadly known as Atmospheric Pressure Chemical Ionization (APCI). In an APCI, the highly energetic ions formed by the corona transfer their charge to intermediate ions with lower energy levels, mostly ionized water clusters. Then, these water clusters transfer their charge to the analyte of interest in the gas phase. This approach is soft because the sample molecules get ionized by the low energy ions, that gently transfer their charge not fragmenting the newly formed ion. However, despite the fact that most sample molecules are gently ionized, a fraction of them pass through the high energy plasma region, in which they are fragmented and ionized. The resulting spectra normally show dominating peaks corresponding with the soft ionized analytes, accompanied by smaller peaks corresponding with fragmented ions. When a complex sample is analyzed, this produces fragments at virtually all masses, which produce a high background signal level that deteriorates the limits of detection.

The invention of Electro-Spray Ionization (ESI) coupled with MS, which is described by Fenn et. al. in U.S. Pat. No. 4,531,056, enabled for the soft ionization and analysis of large molecules in liquid samples. For the present invention, an important feature of Fenn's invention is the counterflow gas (101), which is used to prevent droplets produced by the electrospray (102) from reaching the inlet of the MS (103). This is illustrated in FIG. 1. Fenn used a counterflow plate (104) having an orifice (105) placed in front of the inlet of the MS (103), and introduced the counterflow gas (101) through an inlet (106) placed in the space defined between said counterflow plate (104) and the frontal part of the MS (107). A fraction of the counterflow gas (101) was ingested by the MS through its inlet (103), and the remaining flow formed a jet (108) of gas that passed through said orifice (105) in the opposite direction of the incoming ions, hence the name counter-flow. This jet was sufficiently strong to sweep away the droplets, while ions were pushed by the electric fields to the inlet of the MS. This counterflow feature is used in most Mass Spectrometers today, although the different MS brands use different names. For instance, some brands name it curtain gas. For the present invention, and since the ion source herein described is coupled with pre-existing mass spectrometers that incorporate means to control the supply of curtain or counterflow gas, this gas supplied by the MS will be used, although its purpose will be different. For this reason, in the context of the present invention, we will refer to the counterflow gas (or curtain) as clean gas (109).

Fenn's work revolutionized the field of liquid phase mass spectrometry, but also affected the field of gas and vapor analysis. Although the invention was not intended to be applied to the analysis of gases, Fenn and colleagues noted that traces of vapors in the counterflow (101), which was used to dry the ESI plume (110), were ionized very efficiently and could be detected by the MS. Later on, this ionization mechanism was named Secondary Electro-Spray Ionization (SESI) [2]. Interestingly, although the ionization mechanism in SESI and APCI is similar (low energy ions and ionized water clusters passing their charge to the analyte molecules), SESI does not involve a high energy region. This results in much cleaner spectra with a much better fragmentation background.

In the normal configuration described in U.S. Pat. No. 4,531,056, a fraction of the counterflow (101) is ingested by the MS, and the remaining fraction forms a jet (108) that flows through the counterflow orifice from the inlet orifice of the MS towards the ESI plume to prevent contamination of the low-pressure side of the MS. In the modified configuration used by Fenn and coworkers to ionize and detect vapors, the vapors were directly fed to the counterflow gas. While this approach provided a very good sensitivity, the vapors were also introduced in the vacuum side of the mass spectrometer, which was rapidly contaminated.

One solution to solve this problem was proposed by Martinez Lozano and F. de la Mora in U.S. Publication No. 2010/0264304 A1. FIG. 2 illustrates this set-up. A separated flow, termed sample flow (111), carries the vapors (also termed sample molecules). The sample flow is introduced through a sample inlet (112) into an ionization chamber (113) defined right in front of the counterflow plate (104), and located in front of the inlet (103) of the MS. The counterflow (101) enters this ionization chamber (113) through the orifice (105) that communicates the ionization chamber (113) with the inlet (103) of the MS. An electrospray (102), which is typically formed by a solvent (water and/or methanol) and an acid such as formic or acetic acid, or a base such as ammonia, is also introduced in this ionization chamber (113). The sample flow (111) and the plume (110) of ions produced by the electrospray (102) coexist in an ionization region (114) in which sample ions are formed. The sample ions then traverse the clean region (115), in which counterflowing clean gas (109) sweeps away neutral contaminants, and the ions are accelerated by the local electric fields (116) towards the inlet (103) of the MS.

This configuration solved the contamination problem and was the first functional SESI-MS apparatus. However, its ionization efficiency, which is defined as the ratio of sample ions transferred to the analyzer over sample molecules introduced ion the ionizer, was limited by two main factors: on the one hand, the shear layer (117), which separates the counterflowing clean gas (109) and the sample gas (111), is unstable. As a result, the sample flow (111) and the counterflow clean gas are mixed turbulently. This dilutes the sample molecules. On the other hand, the sample ions are diluted by the Coulomb repulsion produced by the charging ions that are initially produced by the spray.

Despite these limitations, several scientific publications demonstrate that, at least at the proof of concept level, the system described in U.S. Publication No. 2010/0264304 A1 can be useful in many applications. Among other applications, it has been tested for the analysis of breath [3], human skin volatiles [4], saliva [5], for detecting trace concentrations of explosives [6], and to differentiate bacterial cultures [7].

The ionization efficiency of an ionizer is a key parameter that defines its performance. Initial theoretical considerations showed that the ratio p, which is defined as the ratio of the concentration of sample ions over sample molecules (p=ns/Ns, where ns is the concentration of sample ions, and Ns is the concentration of sample molecules), is uniform across the ionization region [8]. Further theoretical and experimental studies showed that, when the sample included reactive vapors that compete for the available electrical charge, charge competition effects reduce the p ratio, thus reducing the ionization efficiency [9]. In addition, mechanistic studies performed with the configuration of U.S. Pub. No. 2010/0264304 A1, also showed that the p ratio can be improved by increasing water content and humidity [10]. While the ionization efficiency improvement can be viewed as an advantage, this is very problematic because the fact that ionization efficiency can change during an analysis due to humidity variations hinders quantitative analysis. In particular, biological samples such as breath, or cell culture headspace, very often carry water vapors, which can change the ionization efficiency of the sample molecules unpredictably. In practice, when a signal increases, the researcher does not know if this is because the concentration of the corresponding species has increased, or because it is being ionized more efficiently. For this reason, the ionization efficiency of an ideal ionizer should be very high, but also very predictable.

An attempt to improve the ionization efficiency of a SESI ionizer was developed by the author of the present invention, and described in U.S. Pat. No. 8,217,342 B2 and U.S. Pat. No. 8,461,523 B2. This invention is illustrated in FIG. 3. In this invention, the ionization region (114) and the clean gas region (115) are effectively separated by an impaction plate (118), which define two separated chambers: an ionization chamber (113), and an impaction chamber (119). In this configuration, the counterflowing clean gas (101) is accelerated through the orifice (105) and impinges against the impaction plate (118) to prevent contaminants and vapors from reaching the inlet (103) of the MS, while the sample flow (111) is accelerated through the impaction orifice (120), which communicates the two chambers. The accelerated sample flow (111) prevents the counterflow gas (101) from entering the ionization chamber (113). The invention described in U.S. Pat. No. 8,217,342 B2 minimizes dilution effects since the ionization region is not affected by the clean counterflow gas (109). The shear layer (117) that separates the sample flow and the counterflow gas expands in the impaction chamber (119). Despite the fact that the flows mix with turbulence in the impaction chamber, the turbulence does not affect the ionization region (114) because it is separated by the impaction plate (118). In addition, the voltage applied at the impaction plate (118) creates an intense electric field (121) that accelerates the ions and reduces their time of residence and their exposure to Coulomb repulsion forces that dilute the sample ions in the clean region (115). This effect is further enhanced by adding an extra focusing electrode (122) within the ionization chamber (113) to further accelerate the ions. As a result, this configuration improved the ionization efficiency by two means: (i) reducing dilution of sample molecules in the gas, and (ii) reducing dilution of the sample ions.

The ionizer described in U.S. Pat. No. 8,217,342 B2 and U.S. Pat. No. 8,461,523 B2 improves the sensitivity. At first, this improved the Limits of Detection (LoD) for various applications, including breath analysis [11,12], plant metabolism analysis [13], e-cigarettes analysis [14], etcetera. However, this configuration creates a new problem: the system is more susceptible to contamination, which condensates on the inner walls (123) of the ionizer. This produces high background signals, which deteriorate the LoD. This is produced by the following reasons: (i) the complexity of the internal geometry of the system is dramatically increased as a result of adding the electrodes. As a result, accessing the internal parts of the ionizer is difficult, and cleaning and maintenance procedures become very time consuming. (ii) The surface area in which contaminants are susceptible to be adsorbed and then desorbed is increased. (iii) In addition, the intricate geometry leads to stagnated regions in which contamination tends to build up. (iv) The ionizer requires metal and insulating materials, which are used to separate the different voltages applied to the different electrodes and parts. The use of different materials increases the number of species that are adsorbed onto the inner walls of the ionizer because, in total, the adsorbed species are the species adsorbed on the metal plus the species adsorbed on the insulating material.

Adsorption of low volatility species, and the associated background signals, which deteriorate the LoD, can be reduced by increasing the temperature of operation of the ionizer. However, the temperature of operation of the SESI described in U.S. Publication No. 2010/0264304 A1, and the SESI described in U.S. Pat. No. 8,217,342 B2 and U.S. Pat. No. 8,461,523 B2, is limited by the boiling point of the electrospray liquid because the electrospray cannot be formed if the liquid boils. As a consequence, the ionizer has to be set at a trade-off temperature: it is as high as possible, but below the limit at which the electrospray cannot be formed. Operating at this temperature is useful to a certain extent to reduce background effects. However, at this temperature, the evaporation of liquid at the Taylor cone meniscus of the spray is quite substantial. Since the different ingredients of the electrospray liquid have different evaporation ratios, the composition of the liquid at the very tip of the cone varies in an uncontrolled fashion. This reduces the predictability of the electrospray conditions, thereby affecting the predictability of the ionization efficiency. This is particularly problematic because small convection changes, temperature variations, or even humidity variations, affect the composition of the liquid arriving at the tip of the meniscus when the temperature of the ionizer approaches the boiling point of the liquid.

The combined effects of humidity, charge competition effects, and evaporation of the electrospray solvents, have an important effect on the final ionization efficiency. Since these variables are not controlled, for a given amount of neutral sample molecules, the sample ions outputted by the ionizer can vary depending on the specific conditions of the analysis. The observed signals of the sample ions are proportional to the concentration of the analyte molecules, as demonstrated in various studies [9,15,16], but the constant of proportionality depends on the specific conditions of the ionizer, which cannot be controlled a priory in a regular in-vivo analysis. This results in a signal variability that hinders the quantitative determination of the measured species.

On top of this, since the boiling point of the electrospray liquid is below the boiling and/or sublimation point of most of the low volatility species of interest, the temperatures that can be achieved with these configurations are not sufficient to ensure that the analytes of interest do not condensate onto the inner walls (123) of the ionizer. As a result, low volatility species tend to condensate and be desorbed onto the inner walls of the ionizer, thus increasing the background levels.

In an attempt to increase the temperature of operation, an electrospray with high boiling point solvents was used in the invention described in U.S. Pat. No. 9,297,785 B2. Examples of polar high boiling point solvents include dimethyl sulfoxide or long-chain alcohols such as octanol. While these solvents enable an increase in the temperature of operation of the ionizer, they are usually not compatible with the mass spectrometer. This is precisely because of their high boiling point. When the mass spectrometer ingests some droplets of water or methanol, they are rapidly evaporated in the vacuum side of the MS and pumped down by the vacuum system of pumps. In contrast, if a high boiling point liquid is ingested by the mass spectrometer, it accumulates in the low-pressure parts of the spectrometer, and it evaporates very slowly. The vapor pressure of these liquids is high enough to deteriorate the mass spectrometer performance, but not enough for the vacuum pump system to eliminate them efficiently. For this reason, in the invention described in U.S. Pat. No. 9,297,785 B2, the SESI that was operated with high boiling point solvents was not coupled with a mass spectrometer. Instead, it was coupled with a Planar Differential Mobility Analyzer (DMA) that was then coupled with an MS as described in U.S. Pat. No. 7,928,374. In this SESI-DMA-MS setup, the high boiling point solvents that could harm the MS are carried away by the gas flow of the DMA so that they do not reach the MS. This configuration solves the compatibility problem between the high-temperature SESI and the MS, but it is limited only to the case in which a DMA is interposed between the SESI and the MS.

In conclusion, previous SESI configurations show promising results, but they are subjected to the following problems:
(i) previous attempts to improve the ionization efficiency are prone to contamination over time. This results in high signal background levels, which deteriorate the Limits of Detection of the instrument;

(ii) the temperature of operation in the ionization region is limited by the boiling point of the electrospray liquid, which is limited by the type of analyzer connected downstream of the SESI. When the SESI is coupled directly with a mass spectrometer, this limits the maximum operating temperature of the system. As a result, low volatility species tend to condensate in the inner walls of the ionizer, thereby increasing background signals and deteriorating LoD;

(iii) since the temperature in the ionization chamber is very close to the boiling point of the electrospray liquid, evaporation of the electrospray liquid in the tip of the spray is quite substantial. This affects the stability and the repeatability of the electrospray. As a result, the signals become unstable, lowering the quality of the measurements.

(iv) humidity content and charge competition effects affect the ionization efficiency, which depends on the particular configuration of the measurement, and which is not always constant and predictable. As a result, establishing a direct correlation between the signal intensity produced by an analyte, and its concentration in the sample gas is not always possible. This hinders quantitative analysis.

Accordingly, one objective of the present invention is to provide a new configuration that reduces the background contamination signals, while it maintains an optimized ionization efficiency.

Another objective of the present invention is to improve the repeatability and the stability of the spray when operating at high temperatures.

Another objective of the present invention is to improve the predictability of the ionization efficiency.

Yet another objective of the present invention is to control the humidity of the flows in the ionizer so as maintain a predictable ionization efficiency level.

Finally, another objective of the present invention is to enable continuous monitoring of the ionization efficiency so as to facilitate a quantitative correlation between signal intensity and analyte concentration in the gas phase.

One goal of the present invention is to keep the ionization region (114) and the clean gas region (115) separated to minimize the dilution of sample molecules within the ionization region. Passing efficiently the sample ions created in the ionization region towards the inlet of the analyzer is crucial to analyze and detect them. These objectives of the present invention are shared with the invention described in U.S. Pat. No. 8,217,342 B2 and U.S. Pat. No. 8,461,523 B2. However, the objectives of the present invention differ in that the new invention reduces the background levels produced by internal contamination, and improves the predictability of the ionization efficiency. For this, in the present invention, we want to minimize the area of the inner walls (123), onto which low volatility species condensate to be then desorbed. To reduce the area of the inner walls (123), one key feature of the new configuration is that the electrodes previously used in the ionization chamber to separate the ionization region and the clean gas region and to focus the ion beam (i.e. the impaction plate (118) and the focusing electrode (122)) must be removed since they account for the majority of the surface of the inner walls (123).

In order to keep the ionization (114) and the clean gas region (115) separated, and to focus the ions towards the inlet of the analyzer (103) without electrodes, the new invention must rely solely on a carefully arranged fluid configuration. Since the flows cannot be separated by a solid wall, the boundary layer (117) that separates the two flows (the sample flow (111) and the clean gas (109)) must be stable and act as a virtual wall so that the ionization region and the clean gas region can be well defined, and dilution can be prevented. In addition, since no extra electric fields can be created because no extra electrodes are allowed, the clean gas flow must focus the ions towards the inlet of the analyzer (103), and be strong enough to reduce the time of residence of the ions, and hence dilution due to Coulomb repulsion in the clean gas region (115). For these reasons, understanding the flow configuration of the SESI in detail, and being able to accurately simulate it is of paramount importance.

A numerical method was developed which combined fluid mechanics, electrostatics, chemical reactions, and the analytical solution of the tip of the electrospray [16]. This method was used to fine-tune the geometrical design of the ionizer described by the inventor in U.S. Pat. No. 8,217,342 B2 and U.S. Pat. No. 8,461,523 B2, and it resulted in the ionizer described in [16]. The empirical results and the results simulated with this method were coherent for sample flows above 0.5 lpm. The ionization efficiency of the ionizers designed with this numerical simulation method falls dramatically when the sample flow is below 0.5 lpm, but the simulations failed to predict this. This mismatch between simulated results and empirical results indicated that a new numerical method was required to better understand the fluid mechanics within the SESI.

For this reason, a new numerical method has been developed. The new numerical method is different from the numerical method described in [16], in that it also simulates the transfer of kinetic momentum from the ions to the neutral gases, which dominates the configuration at low sample flow rates. This method has been developed to better understand the flow configuration of SESI. It has not been published at the date of filing of the present patent application, and, to the best knowledge of the inventor, it is the most comprehensive numerical method developed to date to simulate the flow configuration of SESI.

This new numerical method shows that the force exerted by the moving ions on the neutral gas induces the formation of a toroidal vortex (125) centered about the axis of the electrospray (102), positioned right in front of it, and with the flow in its center moving in the same direction as the ions. This toroidal vortex (125) is of paramount importance because it covers part of the ionization region (114). Interestingly, the volumetric flow induced by the toroidal vortex, which can be estimated as the integral of the velocity over the central section of the toroidal vortex, is approximately 0.5 lpm. This coincides with the sample flow below which the ionization efficiency of the ionizer described in U.S. Pat. No. 8,217,342 B2 and U.S. Pat. No. 8,461,523 B2 and in [16], falls dramatically.

FIG. 4 shows the streamlines (124) simulated with the new numerical method for the configuration described in U.S. Publication No. 2010/0264304 A1. It comprises a counterflow plate (104), an inlet to the MS (103), and an electrospray (102). The sample flow is 0.1 lpm, and the counterflow was reduced so that it is all ingested by the mass spectrometer, and no jet (108) is formed. This figure shows how the toroidal vortex (125) is formed right in front of the electrospray (102), dominating the flow configuration in the ionization region. Note that, despite the fact that the counterflow (101) is very low and does not produce a new flow of counterflow gas into the ionization chamber (113), part of the counterflow gas (101) is sucked by the toroidal vortex (125) into the ionization chamber (113), and it is then redirected to the inlet of the mass spectrometer (103). As a result, the electrospray plume (110) is mostly filled with counterflow gas, and the sample flow (111) is not ionized.

This illustrates that the interaction between the toroidal vortex, the clean gas, and the sample gas must be taken into consideration if one is to improve the performance of a SESI ionizer. For this reason, part of this invention specification describes this interaction, the problems associated with this interaction, and how the present invention addresses these problems.

SUMMARY AND DISCLOSURE OF THE INVENTION

The present invention provides an ionizer to ionize molecules floating in a flow of sample gas (111) at atmospheric pressure, and to transfer the resulting ions into the inlet of an analyzer (103) that analyzes and detects said resulting ions. The ionizer of the present invention is specifically optimized for the analysis of molecules with low volatility species.

The new ionizer comprises an ionization chamber (113) that houses a source of charging ions (102). The flow of sample gas (111) is introduced through a sample inlet (112) into said ionization chamber (113). The molecules react with said charging ions in the ionization region (114) and produce sample ions.

The new ionizer comprises a flow deflector (126) arranged between said source of charging ions (102) and the inlet of said analyzer (103) and having an orifice (105) aligned with said inlet of said analyzer (103). A flow of clean gas (109) is introduced in the space defined between said flow deflector (126) and the inlet of said analyzer (103) through a clean gas inlet (106). Said flow deflector (126) accelerates said clean (109) gas towards said inlet of said analyzer (103), and the flow of clean gas is detached from said flow deflector at the edge of said orifice (105). This produces an interface surface in said orifice (105) between said clean gas (109) and said flow of sample gas (111). The streamlines (124) of the clean gas (109) flow collapse at the axis of said orifice (105) and turn towards the inlet of the analyzer (103), where the flow is quickly accelerated towards the analyzer. As a result, no net clean gas (109) is introduced in the ionization chamber (113), and turbulent structures are not introduced into the ionization chamber (113). This configuration minimizes the contamination that enters into the analyzer, and minimizes the dilution of the sample flow (111) due to turbulent mixing with the clean gas (109). In addition, the clean gas (109) focuses the ions towards the inlet of the analyzer (103), thus improving the transmission of ions. The new configuration improves the ionization efficiency by minimizing dilution of neutral sample molecules in the ionization region (107), and by optimizing the flow of ions that are transferred towards the inlet of the analyzer (103). In contrast with its predecessors, the new ionizer does not require extra electrodes to operate. This reduces the surface area of the inner walls (123) of the ionizer, eliminates the stagnated regions produced by the extra electrodes, in which contamination tends to build up, and thus reduces memory effects and background signals. This is particularly important to improve the background levels for low volatility species, which tend to condensate in the inner walls (123) of the system.

When the source of charging ions (102) produces ions moving in a predominant direction, the interaction between said charging ions and the surrounding gas induces the formation of a toroidal vortex (125). Even with a stable configuration, the flow induced by this toroidal vortex (125) can carry the clean gas into the ionization region (114), excluding the sample flow (111) from it, and thus reducing ionization efficiency. Another embodiment of the present invention incorporates groove (134) carved in the side of the flow deflector (126) that is facing the ionization chamber (113). The size of this groove (134) matches the size of said toroidal vortex (125) to lock said vortex (125) in a fixed position. In addition to it, in another embodiment of the present invention, a corner (135) with high curvature is used to induce the detachment of said vortex (125) at a fixed and controlled position. By introducing the sample flow through an opening (138) located above said groove (134) or said corner (135), the toroidal vortex (125) of the present invention sucks the sample flow (111) towards the ionization region (114), thus improving its ionization efficiency.

The toroidal vortex (125) induced by the movement of the charging ions can destabilize the interface between said clean gas (111) and said sample gas (109), causing turbulent mixing and poor ionization efficiency. This is because, in this interface (117), the flow induced by said toroidal vortex (125) flows radially and away from the axis, while the clean gas (109) flows in the opposite direction (radially and towards the axis). In one embodiment of the present invention, the edge of said orifice (105) is blunt, forming a blunt edge (127). As a result, when the clean gas (109) is detached in the blunt edge (127), it produces a second toroidal vortex (128), located in said blunt edge (127). The side of the second toroidal vortex (127) facing the clean gas (109) moves in the same direction as the clean gas (109), and the side of the second toroidal vortex (127) facing the toroidal vortex (125) induced by the movement of the ions also moves in the same direction as the flow induced by this toroidal vortex (125). This reduces the shear stress, improves the stability of the configuration, and thus improves the ionization efficiency.

In another embodiment of the present invention, a secondary outlet (139) is located behind the source of charging ions (102). (Note that, for the purposes of the present invention, in front of the source of charging ions denotes from the source of charging ions (102) towards the inlet of the analyzer (103), and behind the source of charging ions denotes from the source of charging ions (102) and away from the inlet of the analyzer (103)). When the sample flow is introduced through the sample inlet (112) or said opening (138), a fraction (144) of said sample flow is outputted through said secondary outlet (139), carrying contaminants released by the inner walls of the ionizer (123) away from the ionization region (114). When no sample flow (111) is introduced, a fraction of said clean gas (109) flows through said ionization chamber (113), crossing said orifice (105) or said blunted edge (127) in said flow deflector (126), and exiting through said secondary outlet (139). As a result, contaminants accumulated onto the inner walls (123) of the ionizer and released from them are kept away from the ionization region (114), and do not contribute to the background signals.

Another embodiment of the present invention further comprises an exhaust (141) that collects said remaining fraction (144) of said flow of sample gas, and a flow distributor (142) that connects said exhaust (141) and said clean gas inlet (106). The flow of clean gas (109) passing directly from said clean gas inlet (106) to said exhaust (141) through said distributor (142) changes depending on the flow of sample gas (111) inputted through said inlet (112) of sample gas. When no sample gas is introduced, the pressure within the ionization chamber (113) decreases, and the clean gas (109) flows into the ionization chamber. When the sample flow (111) is introduced, the pressure within the ionization chamber (113) increases, and the clean gas (109) is diverted trough said distributor (142), thus allowing the sample gas (111) to fill the ionization chamber (113). Another embodiment of the present invention also comprises a tunable restriction (143) that is used to regulate the pressure drop that causes the clean gas (109) flow to be diverted through said flow distributor (142).

In another embodiment of the present invention, a coaxial inlet (152) and a coaxial outlet (150) of cooling gas (151) form a capsid (149) of cooling gas that is used to cool the source of charging ions (102) and to isolate it from the sample gas (111). Dilution of the sample gas due to the cooling gas (151) is minimized because the cooling gas flows radially and towards the axis, in the same direction as the toroidal vortex, and this helps to stabilize the flow configuration. When the source of charging ions (102) is an electrospray, this enables for the sample gas (111) and the ionization region (114) in front of the source of charging ions to operate at temperatures above the boiling point of the electrospray, while the source of charging ions (102) remains at a lower temperature. As a result, condensation of low volatility species is reduced, and memory effects and background levels are also reduced, thus improving the Limits of Detection for low volatility species.

Another embodiment of the present invention incorporates a secondary inlet (154) to introduce a flow of liquid at said inlet of sample gas (112). This allows for the humidity of the sample gas to be increased to a point for which humidity variations do not change the ionization efficiency. This also allows for the introduction of cleaning solutions when no sample gas is being introduced.

Another embodiment of the present invention specifically optimized for the analysis of breath in real-time further incorporates a regulator (158) connected with a mouthpiece (161) and a pressure meter (163), that stabilizes the pressure and the flow of exhaled breath that is passed (175) into the ionizer (113) despite the variations of the flow exhaled (173) by the person (172) that exhales into the system. Finally, the present invention teaches how to use the present invention for the analysis of breath in real-time.

MORE DETAILED DESCRIPTION OF THE INVENTION

Figure 1:
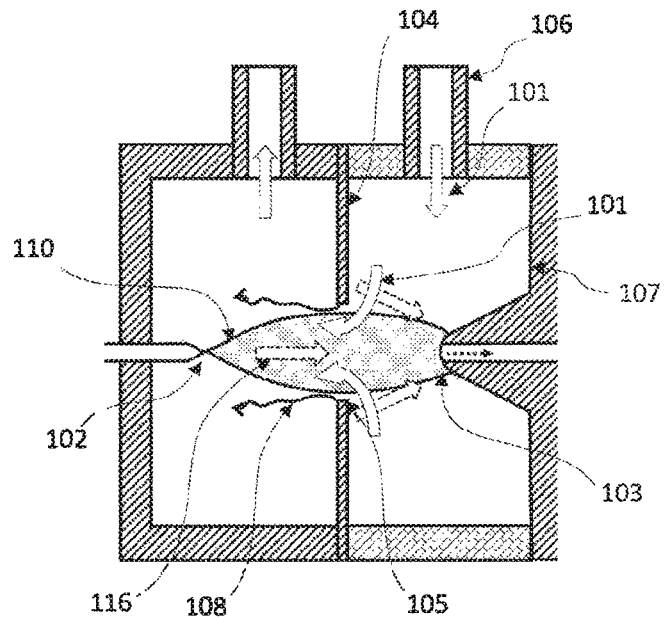
FIG. 1 (Prior Art) illustrates the ionizer described in U.S. Pat. No. 4,531,056, and how it can be used to ionize vapors. This figure is a schematic sectional view.
Figure 2:
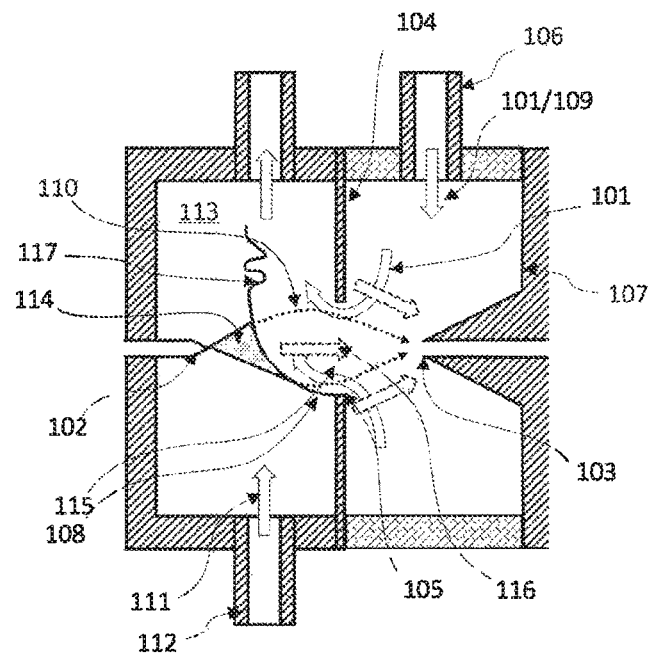
FIG. 2 (Prior Art) illustrates the ionizer described in U.S. Publication No. 2010/0264304 A1. This figure is a sectional view.
Figure 3:
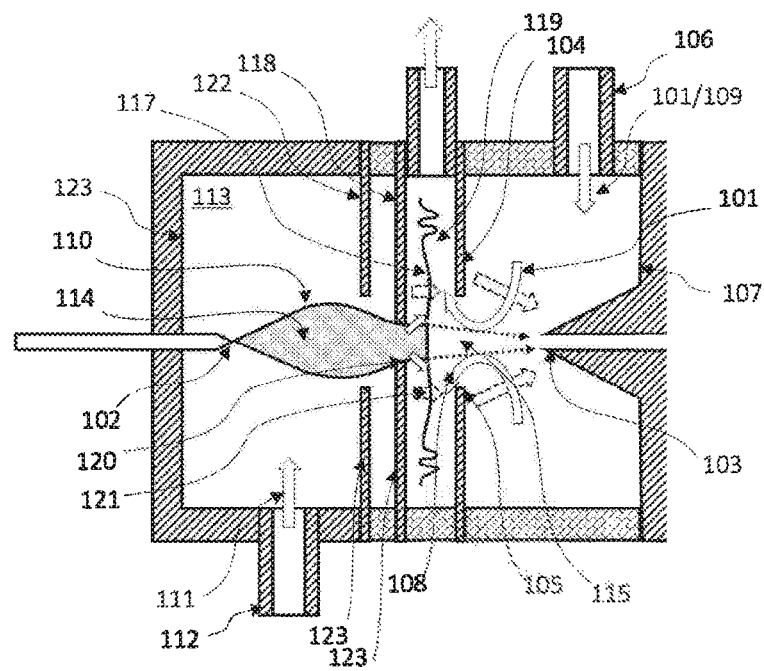
FIG. 3 (Prior Art) illustrates the ionizer described in U.S. Pat. No. 8,217,342 B2 and U.S. Pat. No. 8,461,523 B2. This figure is a schematic sectional view.
Figure 4:
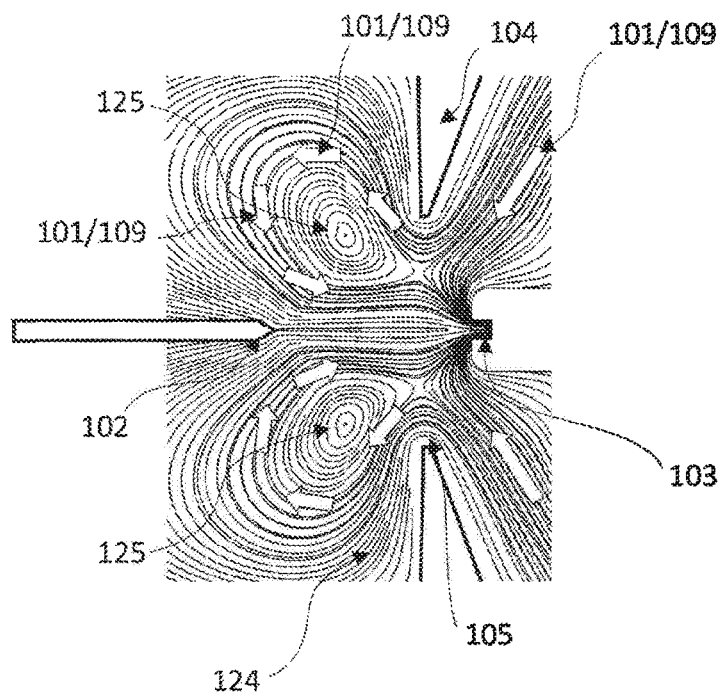
FIG. 4 (Prior Art) illustrates a simulation of the flow configuration of the ionizer described in U.S. Publication No. 2010/0264304 A1, when the sample flow and the counterflow are both very low, the flow is dominated by the vortex created due to the transfer of momentum from the ions to the gas, and the ionization region is filled with clean gas. This results in a very poor ionization efficiency. The streamlines in this figure were computed using a specifically developed numerical method. This figure is a schematic sectional view.
Figure 5:
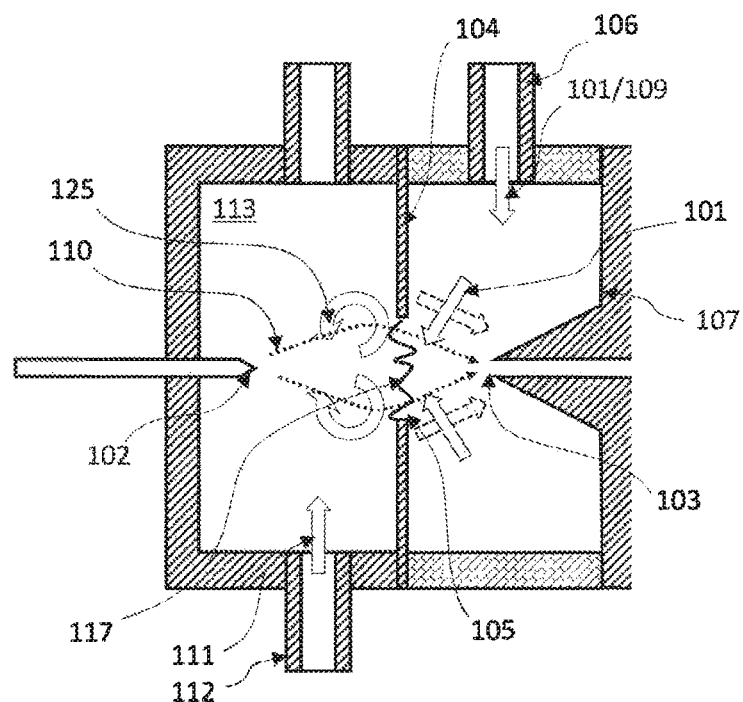
FIG. 5 (Prior Art) illustrates the flow configuration of the ionizer described in U.S. Publication No. 2010/0264304 A1, when the sample flow is very low, and the counterflow is introduced with high radial velocity. This configuration is unstable and could not be simulated because the numerical method did not converge. This figure is a schematic sectional view.

On the Interaction Between the Toroidal Vortex and the Clean Gas:

On the one hand, in the present invention, the clean (109) gas must flow radially towards the inlet (103) of the analyzer to focus and drive the sample ions to the analyzer. On the other hand, the part of the toroidal vortex (125) that is most downstream of the electrospray (102), and hence nearest the clean gas (109), flows radially and away from the central axis. If the clean gas (109) is introduced at low velocity, as in the simulation of FIG. 4, the toroidal vortex (125), sucks the clean gas (109) into the ionization chamber (113), thus preventing the sample flow from being ionized. If the clean gas (109) is introduced with a higher velocity, then the flow configuration becomes unstable, and our numerical method can not cope with turbulence. For this reason, FIG. 5 illustrates this configuration schematically. In the interface (117) between the clean gas (109) and the toroidal vortex (125), the two streams flow in opposite directions (clean gas flowing towards the central axis, and toroidal flow moving away from the center). In normal conditions, this configuration is unstable, and it leads to a turbulent flow that efficiently mixes the clean gas (109) and the flow of the toroidal vortex (125). Since the vortex (125) is right in the ionization region, this turbulence dilutes the sample molecules right in the ionization region, thus dramatically lowering the ionization efficiency. Either way, the toroidal vortex (125) causes the ionization efficiency to be very poor when the sample flow is low, or below 0.5 lpm.

Figure 6:
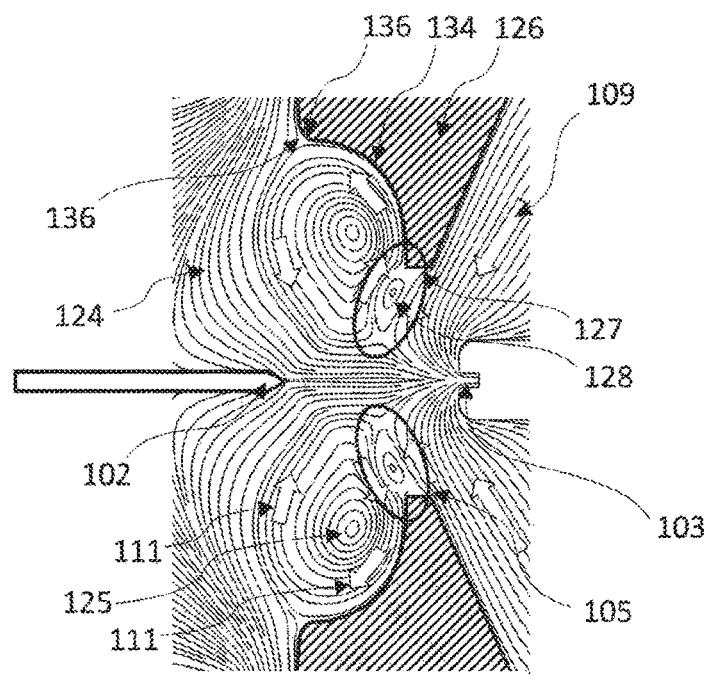
FIG. 6 illustrates a simulation of the flow configuration of the present invention in the region where the sample flow and the clean gas interact. In this simulation, the sample flow and the counterflow are both very low, and the flow is dominated by the vortex created due to the transfer of momentum from the ions to the gas. In contrast with the configuration of FIG. 4, the ionization region is filled with sample gas. This results in a very good ionization efficiency. The streamlines in this figure were computed using a specifically developed numerical method. This figure shows a detail of some key features that help to stabilize the flow. This figure is a schematic sectional view.

To solve this problem, the present invention substitutes the counterflow plate for a flow deflector (126), which is characterized in that it directs the clean gas (109) radially towards the central axis of the ionizer and the MS inlet. The flow deflector also incorporates an orifice (105) to enable the passage of ions from the ionization region (113) to the inlet of the MS (103). It must stabilize an inherently unstable flow configuration. On one side of this orifice (the side facing the MS inlet), the clean gas (109) flows radially towards the central axis of the MS, and then it makes a turn towards the inlet of the MS (103). On the other side of this orifice, the toroidal vortex (125) induces the local gas to flow radially and away from the axis. To stabilize these two opposing flows, the edge of the orifice of the flow deflector is blunted. This blunted edge (127) is illustrated in detail in FIG. 6. The blunted edge (127) creates a second toroidal vortex (128) that turns in the opposite direction as the vortex (125) induced by the movement of the ions. The second toroidal vortex (128) is located between the clean gas (109) that flows towards the central axis and the toroidal vortex (125) induced by the movement of the ions, and the direction of the velocity on both sides of this second vortex (128) is coherent with the clean gas (109) and the toroidal vortex (125). This second toroidal vortex (128) reduces shear stresses in the interface between the clean gas (109) and the toroidal vortex (125), thereby reducing turbulent instabilities.

Figure 7:
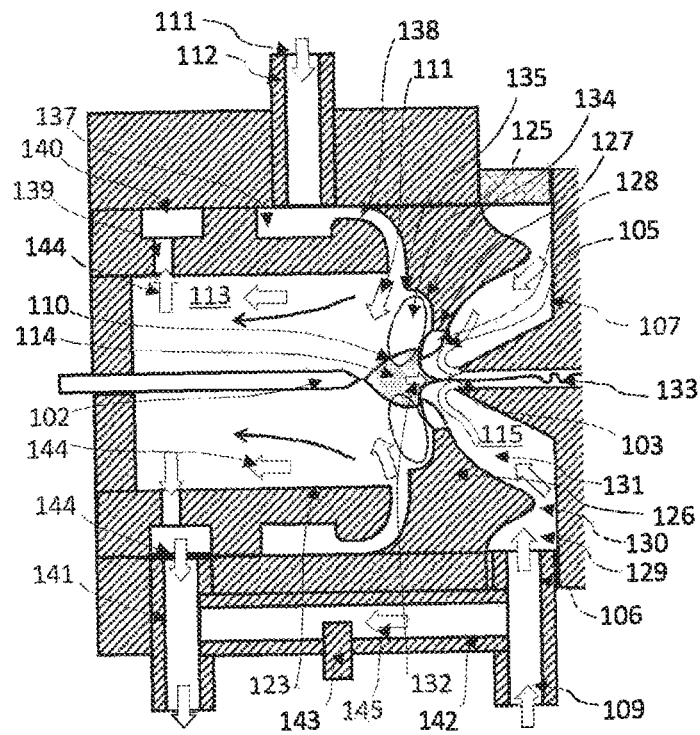
FIG. 7 illustrates the ionizer described in the present invention, when it is operating in analysis mode. This figure is a schematic sectional view.

The flow deflector (126) is also characterized in that it is designed to minimize the turbulent level of the incoming clean gas (109). The clean gas (109) has to be introduced in the space defined between the flow deflector (126) and the frontal part of the MS (107) with very low initial turbulence and with a low circumferential velocity component. For this reason, in one embodiment of the present invention, which is schematically illustrated in FIG. 7, the clean gas is introduced through an inlet (106) in an annular distribution chamber (129) that communicates through a narrowing (130), or through at least two or three or four orifices, with the space defined between the MS inlet piece (107) and the flow deflector (126). This arrangement with two separated steps distributes the flow along the entire perimeter of the geometry and minimizes the circumferential component of the flow velocity that rotates about the central axis of the inlet of the MS.

Eliminating this velocity component is important because swirling would otherwise induce high circumferential velocities when the flow is accelerated radially towards the inlet of the MS due to conservation of angular momentum. There are several methods to eliminate circumferential velocities. For instance, one could substitute the narrowing (130) with an annular piece of uniform porous material, which further improves the uniformity of the velocity and reduces turbulence levels. All these configurations that serve for the purpose of reducing initial turbulence levels and the circumferential component of the velocity are well known to those skilled in the art and are therefore part of the present invention.

After passing through said narrowing (130) or said orifices, the clean gas (109) is ducted in the space defined between the flow deflector (126) and the MS inlet piece (107). In this region, the clean gas (109) first passes through a low-velocity region (131) in which turbulent perturbations caused in the narrowing are dampened. After this, the relaxed clean gas is smoothly accelerated towards the axis inlet of the MS.

Finally, the clean gas (109) has to make a turn as it approaches the central axis and it is ingested by the MS. Importantly, the boundary layer on the wall of the flow deflector (126) has to be constantly accelerated to ensure that the flow remains laminar, but this turn is accompanied by an adverse pressure gradient that could potentially destabilize the boundary layer. To avoid this, the orifice (105) has to be wide enough so that the clean gas is detached at the blunt edge (127) before it starts turning. The boundary layer of the clean gas that is on the side of the MS cannot be carefully controlled because the geometry of the MS is already defined by the MS producer (note that one of the purposes of this invention is to provide an ionization source that can be coupled with pre-existing mass spectrometers). Despite this, since this boundary layer is ingested by the MS, and it interfaces with the sample gas, the perturbations in this boundary are not as important.

The design of the flow deflector (126) has to be optimized for each model of mass spectrometer because the velocity profile, and hence the stability of the configuration, is defined in conjunction by the flow deflector (126) and the frontal part of the MS (107). This specific design is preferably optimized by trial and error by means of computational fluid mechanics methods that account for all the effects herein described, but other approaches, including empirical approaches, are known to those skilled in the art and are included in the present invention.

Moving back to the flow configuration in the interface between the clean gas and the sample gas. Despite the fact that the turbulence level of the incoming clean gas is very low (thanks to the carefully designed inlet and the continuously accelerated boundary layer), the configuration involving two toroidal vortexes (125 and 128) (one induced by the moving ions, and a second vortex formed downstream of the blunt edge of the orifice) and a turning clean gas (109), which first moves with preferential radial velocity, and then turns its direction towards the inlet (103) of the MS, can easily become unstable. To prevent turbulent structures to develop in the interface between the sample flow (111) and the clean gas (109), a fraction of the sample flow (132) is ingested by the MS, together with the clean gas (109). As a result of this, the boundary (133) that separates the two flows is quickly accelerated towards the inlet (103) of the MS, and turbulent structures do not have sufficient time to develop. Even though the configuration is unstable, instabilities do not have sufficient time to develop, and the flow remains stable.

On the Interaction Between the Toroidal Vortex and the Sample Flow:

The toroidal vortex (125) induced by the movement of the ions is formed just in front of the electrospray (102), in the ionization region (114), and the gas within it can be recirculated for a time much longer than the time of residence of other flow particles that are not recirculated. For this reason, controlling what gas is fed into the toroidal vortex (125) is important to achieve a good ionization efficiency.

A first step to control what gas is recirculating in the vortex (125) is controlling the vortex (125) itself. In the ionizer described in U.S. Pat. No. 8,217,342 B2 and U.S. Pat. No. 8,461,523 B2, if no focusing electrode (122) is incorporated, then a vortex (125) forms in front of the impaction plate (118). The vortex forms a recirculation bubble with a toroidal shape and a detachment line. Since this plate is flat, the position of the detachment line is not well defined. This results in the vortex (125) shape depending greatly on slight variations in the sample flow (111) and other imperfections. For instance, since the electrospray capillary is very thin and elongated, the tip (102) can normally be misaligned for up to 1 mm about the center of the impaction orifice (120). This causes the vortex (125) to be misaligned with respect to the impaction orifice (120), which causes the flow configuration to be non-symmetric, difficult to predict, and more prone to turbulence. This also applies to the configuration described in U.S. Publication No. 2010/0264304 A1. If a focusing electrode (122) is incorporated in the ionizer described in U.S. Pat. No. 8,217,342 B2 and U.S. Pat. No. 8,461,523 B2, then the configuration is even more complicated because the focusing electrode (122) disrupts the vortex flow, thereby accelerating the onset of turbulence.

To solve this problem, the present invention incorporates a circular groove (134) in the ionization side of the flow deflector (126). Said circular groove (134) is illustrated in detail in FIG. 6, and it is characterized in that its size and position matches that of the vortex (125). As a result, the vortex (125) is centered about the orifice (105) of the deflector electrode (126), regardless of variations in the sample flow (111) and the exact position if the tip of the electrospray (102) because it is confined by said groove (134). In addition, a circular corner (135) with high curvature is defined at the outer diameter of the groove (134). This region precipitates the detachment of the vortex (125) flow. As a result, this geometry fixes the position of the detachment line (136), resulting in a more reliable and predictable flow configuration over a wider range of flows and other errors, including misalignment errors.

In one embodiment of the present invention, the sample flow (111) is introduced with an axisymmetric inlet, and reduced turbulent levels. This is important to keep a stable toroidal vortex (125). FIG. 7 illustrates this feature of the present invention. Ensuring that the entire configuration is axisymmetric allows for it to be simulated with a relatively low computational power, and to be optimized more easily. In the present invention, the sample flow is introduced through a sample inlet tube (112) into an annular relaxation chamber (137) that distributes the flow and allows for turbulent perturbations to be dampened. This annular chamber (137) communicates with the ionization chamber (113) through an annular and axisymmetric opening (138). This axisymmetric inlet (138) is located above the circular corner (135) with high curvature. As a result, in this region, the sample gas (111) and the toroidal vortex (125) flow in the same direction, the vortex (125) sucks the sample flow (111), and the sample molecules are directly driven towards the ionization region (114) by the toroidal vortex (125) even when the sample flow (111) is very low. Consequently, the configuration maintains a high ionization efficiency even at very low flow rates.

On the Effect of the Toroidal Vortex on the Background Levels:

The toroidal vortex (125) creates a recirculating current within the ionization chamber (113). The gas that is in contact with the inner walls (123) of the ionizer is first detached from the walls (123), and then it is directed to the ionization region (114). As a result of this, the contamination released by the inner walls (123) is efficiently transported to the ionization region, ionized, and the resulting ions passed to the analyzer. This exacerbates the intensity produced by background contamination. Combined with the fact that the temperature of the inner walls (123) of the ionizer is limited by the boiling point of the electrospray, this causes low volatility species to be adsorbed onto the inner walls of the ionizer and then to be released and ionized for very long periods of time. Paradoxically, this causes the background signals to rise when the sample flow is very low, or even zero.

The ions outputted by an ideal ionizer should fall when no sample is introduced, in contrast, the toroidal vortex (125) causes the background signals to rise when no sample flow is introduced. In the present invention, this effect is mitigated by the following means:

(i) the toroidal vortex (125) is confined to a small region of the ionization chamber (113) by the circular groove (134) and the circular corner (135).

(ii) the sample flow (111) is introduced radially to create a curtain of gas that divides the ionization chamber (113) into two regions: an ionization region located in front of the electrospray (102), and a free region located in the back of the spray.

As a consequence, only the inner walls (123) of the groove (134) contribute to enhancing the background. Compared with other configurations, this reduces the total area, the total amount of material, and hence the background signals produced by it.

However, for this arrangement to function properly, the sample flow (111) has to be strong enough. When no sample flow is introduced, the toroidal vortex (125) induces a recirculation in the entire ionization chamber (113) that greatly increases background levels. To overcome this problem, the present invention incorporates a secondary outlet (139), which is also illustrated in FIG. 7. This secondary outlet (139) is located in the back of the ionization chamber (113). A small fraction of gas of the ionization chamber (113) is outputted through this secondary outlet (139). The amount of gas outputted through this secondary outlet (139) is enough to sweep the contamination released by the inner walls (123) away from the ionization region (114) when no sample flow (111) is introduced. As a consequence, background levels are not exacerbated. In addition, when no sample flow (111) is introduced, this secondary outlet (139) allows for some clean gas (109) to enter into the ionization chamber (113), effectively cleaning it when it is not being used. To obtain an approximately axisymmetric flow configuration, one embodiment of the present invention, incorporates more than one secondary outlet (139) radially distributed. The secondary outlet (139) communicates with a secondary annular chamber (140), that collects the flow of all secondary outlets, and directs it to an exhaust tube (141).

This setup is particularly useful for the analysis of breath in real-time. For this type of application, the sample flow (111) is only introduced when the subject being studied is exhaling, and no sample flow is introduced when the subject is inhaling new air. This setup allows for the system to clean itself automatically when the subject is inhaling.

In one embodiment of the present invention, when no sample flow is introduced, a fraction of the clean gas (109) is allowed to enter in the ionization chamber (113) and to flow through the annular and axisymmetric opening (138), the annular relaxation chamber (137), and the sample inlet (112) in the opposite direction as the normal sample flow.

This helps to clean all these parts when no sample flow is introduced. In particular, this is very useful for the analysis of breath samples. However, this complicates the design of the ionizer because it must operate sequentially in two consecutive modes: (i) analyzing mode, and (ii) cleaning mode. In the analyzing mode, the sample is introduced in the ionization chamber (111). In the cleaning mode, a fraction of the clean gas (109) flows into the parts normally exposed to the sample gas and sweeps away all the contaminants deposited onto the inner walls of the system during the analysis.

Handling two modes of operation is normally done by means of valves, which direct the flows in the desired direction. However, for the purpose of the present invention, introducing a valve in a section of the flow path that could eventually communicate with the ionization chamber (113) is very problematic because the friction of the moving parts of the valve releases contaminants that contribute to increasing background levels. In addition, valves increase the area that is exposed to contamination and normally have cold spots in which contamination tends to accumulate. For these reasons, one embodiment of the present invention provides a configuration that allows for the two flow modes to be controlled without valves.

FIG. 7 illustrates one preferred embodiment of the present invention, in which the exhaust tube (141) communicates through a flow distributor (142) with the clean gas inlet (106). This flow distributor (142) allows for the clean gas (109) inputted into the annular distribution chamber (129) to adjust automatically for each circumstance. Additionally, this distributor (142) incorporates a tunable restriction (143) that can be fine-tuned for each application to control the exact volumetric flow of clean gas (109) that is diverted through said distributor tube. As illustrated in FIG. 7, when the sample flow (111) is introduced through the sample inlet (112), a fraction of the sample gas (109) is ingested by the mass spectrometer, and the remaining fraction (144) is outputted through the secondary outlet (139). The flow of clean gas (109) inputted through the clean gas inlet (106) is fixed, but only the amount of clean gas required to feed the inlet (103) of the mass spectrometer, which ingests a fixed flow rate, is passed into the annular distribution chamber (129). The remaining clean gas (145) is directed towards the exhaust tube (141) through the tunable restriction (143) and the flow distributor (142). When the sample flow (111) increases, the clean gas (109) that is directly exhausted is increased, thus compensating for the excess. As a result, the ionizer is self-regulated without valves. The purpose of the tunable restriction (143) is to create a pressure drop that allows the user to regulate the ratio of sample flow over clean gas that is ingested by the mass spectrometer. This ratio depends on the specific application, and it has to be set by the user. For instance, is the sample flow is very contaminated, this ratio should be kept very low to prevent contaminating the instrument. If the sample is very diluted, then this ratio can be higher.

Figure 8:
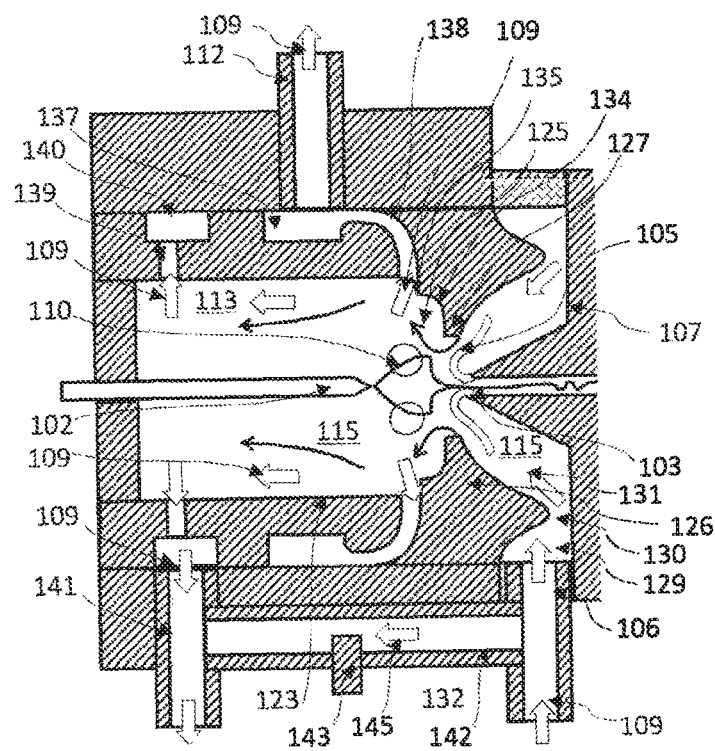
FIG. 8 illustrates the ionizer described in the present invention, when it is operating in cleaning mode. This figure is a schematic sectional view.

FIG. 8 illustrates the flow configuration when the sample flow (111) is zero or when the sample inlet is open (112). When no sample flow is introduced through the sample inlet (106), the pressure within the ionization chamber (113) is lower, and the clean gas (109), which is constantly introduced at a fixed flow rate, flows into it, filling it with clean gas. Some of the clean gas is outputted through the secondary outlet (139), therefore cleaning the ionization chamber (113). If the sample inlet (106) is open, a fraction of the clean gas (109) flows from the ionization chamber (113) towards the inlet (106), thus cleaning the inlet circuit. In short, when sample flow is introduced through the sample inlet, the flow configuration sets itself automatically in analyzing mode. If not, it sets itself in cleaning mode.

On the Temperature:

Controlling the temperature of the ionizer is very important. The temperature of the inner walls (123) of the ionizer is preferably controlled by means of an electrical resistive heater. A thermocouple and a Proportional Integral Derivative controller (PID) can be used to adjust the electric power applied and control the temperature. Other temperature control methods are known for those skilled in the art and are also included in the present invention. In one embodiment of the present invention, the electric resistor is a wire that is wrapped around the ionization chamber to apply heat evenly so that the temperature distribution is uniform. The temperature of the sample inlet (106) tube that carries the sample flow (111) towards the ionization chamber (113) is similarly controlled. The temperature of the clean gas (109) in the clean gas region is defined as the gas passes through the space defined between the flow deflector (126) and the frontal part of the MS. The flow deflector (126) is in good thermal contact with the ionization chamber (113), and thus its temperature is similar to it. Some mass spectrometers include a heater that controls the temperature of the inlet (103) and the frontal part (107) of the MS. In these mass spectrometers, the clean gas can be heated simply because it is in contact with the frontal part (107) of the MS. In an embodiment of the present invention designed for mass spectrometers that do not include a heated frontal part (107), a set of fins (146) are incorporated in the low-velocity region. These fins (146) allow for the clean gas (109) to be more efficiently heated by the heat conducted through the flow deflector (126). This allows controlling of the temperature of all gases in the ionization region (114) and the clean gas region (115).

In the present invention, the contaminants released by inner walls (123) of the parts of the ionization chamber that are between the annular opening (138), through which the sample gas is introduced in the ionization chamber, and the secondary outlet (139) are flushed through said secondary outlet (139) and do not reach the electrospray plume (110). As a consequence, the ionization source is immune to contamination in this region, and thus, operating this region at a very high temperature is not required. This creates the possibility to operate the ionization chamber (113) with two different temperatures: (i) a high-temperature region (147), in front of the electrospray tip (102), and (ii) a low-temperature region (148), behind the electrospray tip (102). This allows for the electrospray (102) to be operated below the boiling point of the electrospray liquid while keeping the parts that contribute to the background of the ionizer at a higher temperature.

Figure 9:
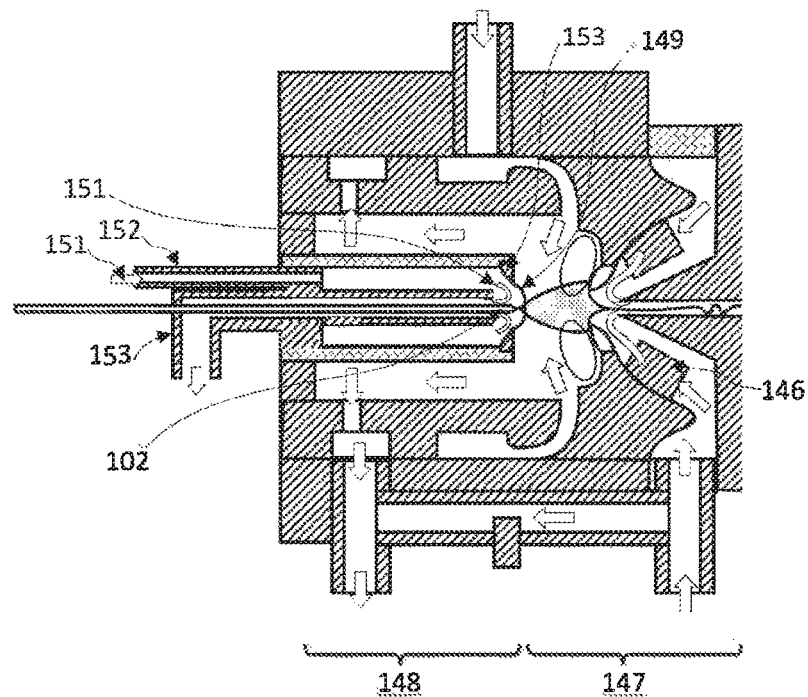
FIG. 9 illustrates the ionizer described in the present invention, further incorporating a cooling flow that forms a capsid of cooling gas that cools the electrospray so that the temperature of the ionization region can be increased above the boiling point of the electrospray liquid. This figure is a schematic sectional view.

This arrangement requires to carefully control the two temperatures and the temperature gradient thus formed. FIG. 9 shows another embodiment of the present invention that allows for the temperature in the high-temperature region (147) to be dramatically increased above the boiling point of the electrospray liquid. In this embodiment of the present invention, a capsid of cooling gas (149) is used to cool the electrospray (102). In this configuration, the electrospray capillary is introduced through a coaxial cooling tube (150). A flow of cooling gas (151) is introduced through a cooling inlet (152) that is coaxial with the electrospray (102) capillary and the cooling tube (150). In one embodiment of the present invention, the cooling inlet (152) incorporates a cooling flow deflector (153) that directs the cooling flow (151) towards the axis of the electrospray (102). In the interface between the cooling flow (151) and the toroidal vortex (125), both streams move in the same direction (radially towards the center). This allows for a steady configuration with low turbulence to be formed. The cooling gas (151) is introduced at a temperature below the boiling point of the electrospray liquid, and the meniscus of the electrospray is kept inside the capsid of cooling gas (149). Since the temperature within the capsid of cooling gas can be defined independently from the temperature in the ionization region (114), the temperature of the high-temperature region (147) and the ionization region (114) can be raised above the boiling point of the electrospray liquid so that low volatility species are not condensed. This embodiment dramatically improves background levels by enabling higher temperatures of operation in the ionization region (114) and in the inner walls (123) that contribute to the background levels. A high thermal gradient is produced at the interface between the cooling gas (151) and the sample gas (111). Some volatiles diffusing through said interface condensate as they cool down, and unavoidably some can condensate at the walls of the cooling tube (151). Nevertheless, the condensation of volatiles in this region is not problematic because the flow in the low-temperature region (148) carries them away from the ionization region.

This embodiment of the present invention allows for the production of more charging ions. This is because the reduced evaporation in the electrospray meniscus allows for higher flows to reach the jet at the tip, thus increasing the electric current that the electrospray can yield. The electrospray (102) is unaffected by the sample gas (111), and operates steadily, producing a constant and reliable stream of charging ions regardless of the temperature of the sample gas (111). The higher current produced by the electrospray means that it also produces larger droplets. The charging ions and droplets produced by the electrospray (102) at low temperatures are pushed forward by the electric field that is produced by the electrospray. Then, they reach the ionization region (114), where they are mixed with the sample gas (111). The high temperatures of the ionization region (114) rapidly evaporate the droplets, thus producing more charging ions, which react with the sample molecules to produce sample ions.

Other previous electrospray configurations incorporate a stream of gas that can be used to cool the electrospray capillary. For instance, nebulized assisted electrospray incorporates a stream of gas that flows at high velocity around the liquid meniscus in the same direction as the electrospray liquid. This stream of gas creates shear stress on the liquid, thus forming droplets. This flow of gas could also be used to cool the electrospray meniscus. However, the stream of gas that is used in these configurations produces a high-velocity jet, and thus the gas is rapidly mixed with the gas immediately downstream of the electrospray. For the purposes of the present invention, this stream of gas dilutes the sample molecules, thereby greatly reducing the ionization efficiency of the molecules carried by the sample gas. In contrast, the cooling configuration of the present invention avoids turbulent mixing between the sample gas and the cooling gas. This enables the electrospray to be effectively cooled, while at the same time the sample gas remains undiluted. The result is that the new configuration provides improved background levels while it maintains a high ionization efficiency. These features dramatically improve the limits of detection of the low volatility species. Ultimately, this enables large molecules with very low vapor pressures to be routinely detected in the gas phase.

On the Humidity:

While the mechanism is still not fully understood, it is well known that the humidity content of the sample flow has an impact on the ionization efficiency in SESI. This, combined with the fact that most biologically relevant samples produce different humidity levels, produces variable results. For instance, the dew point of breath is body temperature (36-37° C.). In this case, the humidity level is very consistent between different samples, but the humidity produced by the leaves of a plant can change depending on many factors that cannot be controlled. These include irrigation, the plant response to hydric stress, and other unknown factors. Similarly, the humidity produced by cell cultures can depend on the specific evaporation of water in the culture, which varies from one culture to another. Ideally, the signals measured should be proportional to the concentration of the analyte of interest, and the calibration ratio (concentration over signal level) should be constant and easy to characterize. However, these uncontrolled variations in the humidity produce uncontrolled variations in the ionization efficiency, which lead to apparently erratic signal variations. Ultimately, this reduces the confidence of the results, hindering quantitative characterization.

Interestingly, when the humidity is low, the ionization efficiency grows with increasing humidity content, but, as the humidity is increased, the ionization efficiency reaches a plateau and its dependence on small humidity variations becomes negligible. It is hypothesized that water plays a role in the charge transfer reactions that take place between the charging ions and the analyte molecules, but as all ions are hydrated, the system becomes saturated with water. Regardless of the validity of this hypothesis, the empirical fact is that water increases the ionization efficiency until the system is saturated. In one embodiment of the present invention, humidity is introduced in the system to ensure that it is saturated with water molecules. Saturating the system with humidity has two main advantages: (i) it improves the ionization efficiency, which improves the Limits of Detection, and (ii) it reduces the variability of the ionization efficiency, thus improving the quality of the obtained data.

Figure 10:
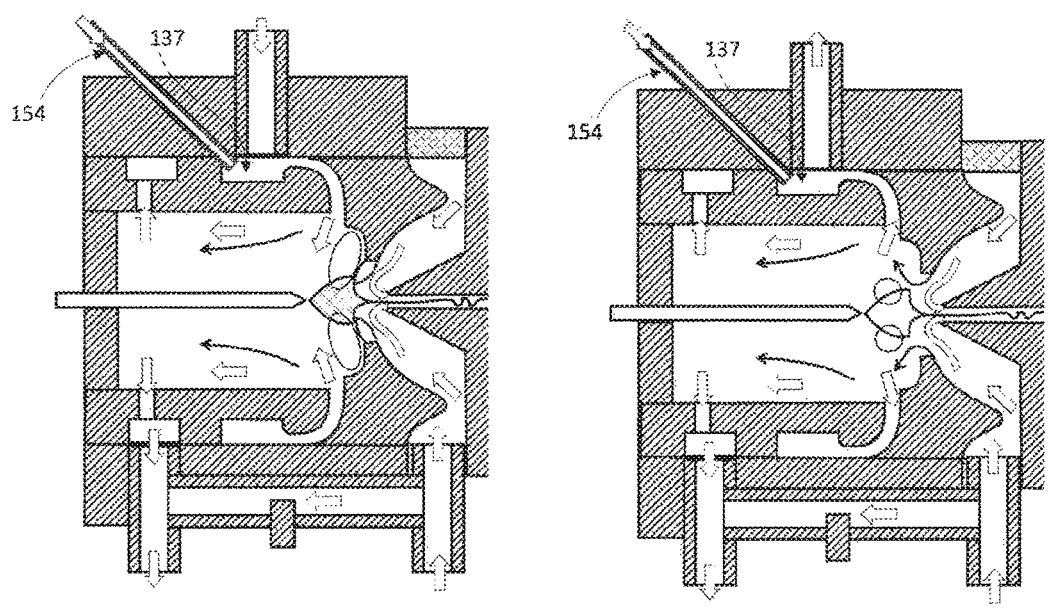
FIG. 10 illustrates the ionizer described in the present invention, further incorporating a secondary inlet for the introduction of humidity, cleaning solutions, and calibrants. This figure is a schematic sectional view.

FIG. 10 illustrates one embodiment of the present invention, which incorporates a secondary inlet (154) that is used to introduce a controlled flow of liquid into the annular relaxation chamber (137). The flow of liquid can be controlled by an external pump, or by a valve, or manually. For instance, in one embodiment of this invention, this secondary inlet is connected with a syringe pump through a capillary, and the pump is activated in response to pressure variations in the exhaust. This automatically turns the pump on and off when the system operates in analyzing or cleaning mode.

In one embodiment of the present invention, when the flows within the ionizer are arranged in analyzing mode, a controlled flow of water is injected in this chamber (137), wherein it evaporates before reaching the ionization chamber (113). As a consequence, this increases the humidity level within the ionization region (114).

In other embodiment of the present invention, a liquid of cleaning solution is pumped through said secondary inlet (154) when the flow is cleaning mode. This helps to clean the sample line because some substances are more easily desorbed from the walls of the sample inlet when a solvent vapor is present. Optionally, other more aggressive substances can be used to degrade large molecules so that they become volatile and can be swept by the clean gas more easily.

On the Introduction of Calibrants:

Controlling the humidity improves the ionization efficiency and its predictability. However, the ionization efficiency can still be affected by charge competition effects, which cannot be known a priory. As a result, the proportionality between the signal intensity and the concentration of the sample molecules in the gas phase cannot be known. To solve this problem, in one embodiment of the present invention, traces of known calibrants are introduced at known concentration through the secondary inlet (154). When the analyte of interest is known, a trace concentration of calibrant with similar physical and chemical properties is introduced. This includes similar molecules, molecules with similar functional groups but different chain lengths, or isotopically labeled versions of the analyte of interest. Calibrants are diluted with the liquid that is introduced through the secondary inlet. The signal to concentration ratio of the calibrants is measured in real-time, and the correction factor is determined as the ratio between the signal to concentration ratio measured when no samples are introduced over the signal to concentration ratio measured in real-time. Finally, the signals of the analytes of interest are corrected by multiplying by this correction factor.

Figure 11:
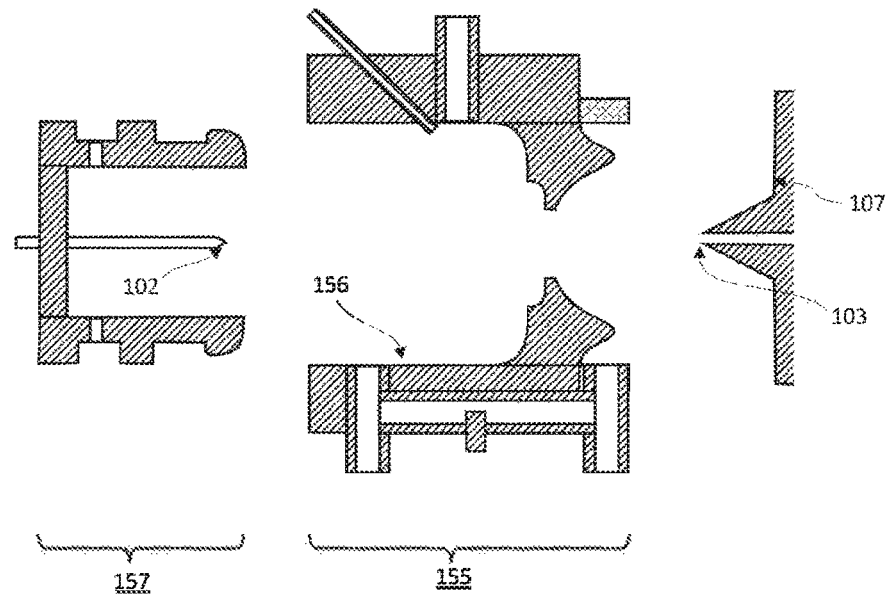
FIG. 11 illustrates the ionizer described in the present invention, further describing an arrangement to ease assembling and cleaning. This figure is a sectional view.

On the Construction and Assembly:

To build the multiple chambers of the present invention, one embodiment of the present invention comprises two parts. The main part (155) incorporates the geometry herein defined as the flow deflector (126), a cylindrical housing (156), the sample inlet (106), the secondary inlet (154), the exhaust tube (141), the flow distributor (142), the tunable restriction (143) and the heaters, including the fins (146), if they are required. The second part (157) incorporates the electrospray (102), the secondary outlets (139). And the second part (157) is housed in the cylindrical housing (156). The annular relaxation chamber (137), the axisymmetric opening (138), and the secondary annular chamber (140) are defined in the cavities formed between the two parts when the second part (157) is inserted in the main part (155). This arrangement is illustrated in FIG. 11, and it is particularly easy to fabricate and to clean. To clean the multiple chambers and channels of the present invention, the user only needs to remove the second chamber and all surfaces become easily accessible to wipe them to remove any contaminant.

Application of the Present Invention for the Analysis of Breath:

The invention herein described is especially suitable for the analysis of breath in real-time because it is optimized for the ionization and detection of low volatility species, and the two modes of operation (analysis and cleaning) match perfectly with the respiration cycle. When the subject exhales into the system, it arranges itself in analysis mode, and it returns to the cleaning mode when the subject is not exhaling into the system so that the background can be reduced for the next exhalation. However, the flow outputted by humans and other creatures as they exhale is very variable. This variability, combined with the fact that the flows in the present invention change in accordance with the sample flow inputted into it, degrades the quality of the measurements.

Figure 12:
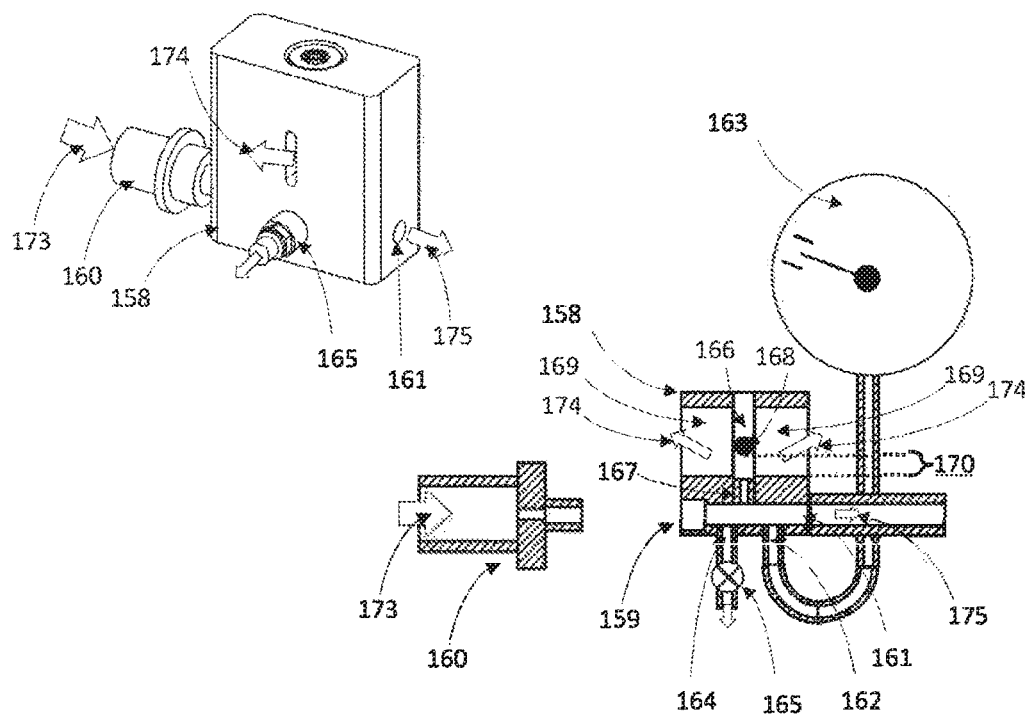
FIG. 12 illustrates a regulator used in conjunction with the present invention to improve the repeatability of online breath analysis. This figure includes a perspective view and a schematic sectional view.

To reduce the variability of the flow inputted into the system when the person exhales into it, the present invention incorporates a system to regulate the flow and the pressure inputted in the ionizer. FIG. 12 illustrates the breath regulator (158) of the present invention. The regulator incorporates an inlet (159) for a disposable mouthpiece (160), an outlet (161) that communicates with the sample inlet (112) of the ionizer, an orifice (162) that communicates with a pressure meter (163), a second orifice (164) that communicates with a tunable flow restriction (165), a vertical passage (166) that communicates with the rest of orifices through a flow restriction (167), and houses a weight (168) that can slide freely along said vertical passage and at least one opening (169) that communicates the vertical passage (166) and the room air.

Figure 13:
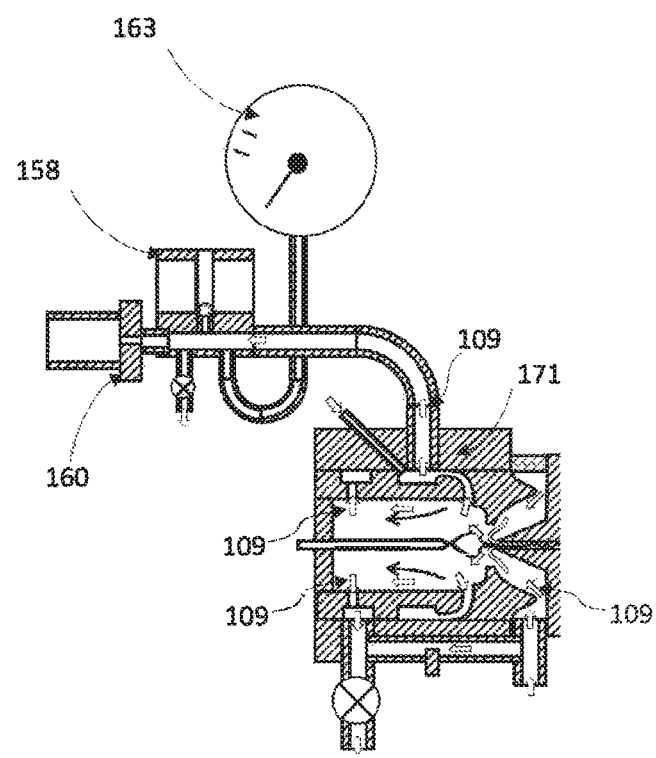
FIG. 13 illustrates the ionizer described in the present invention, further incorporating the regulator described in FIG. 12, when no breath is being analyzed. This figure is a schematic sectional view.
Figure 14:
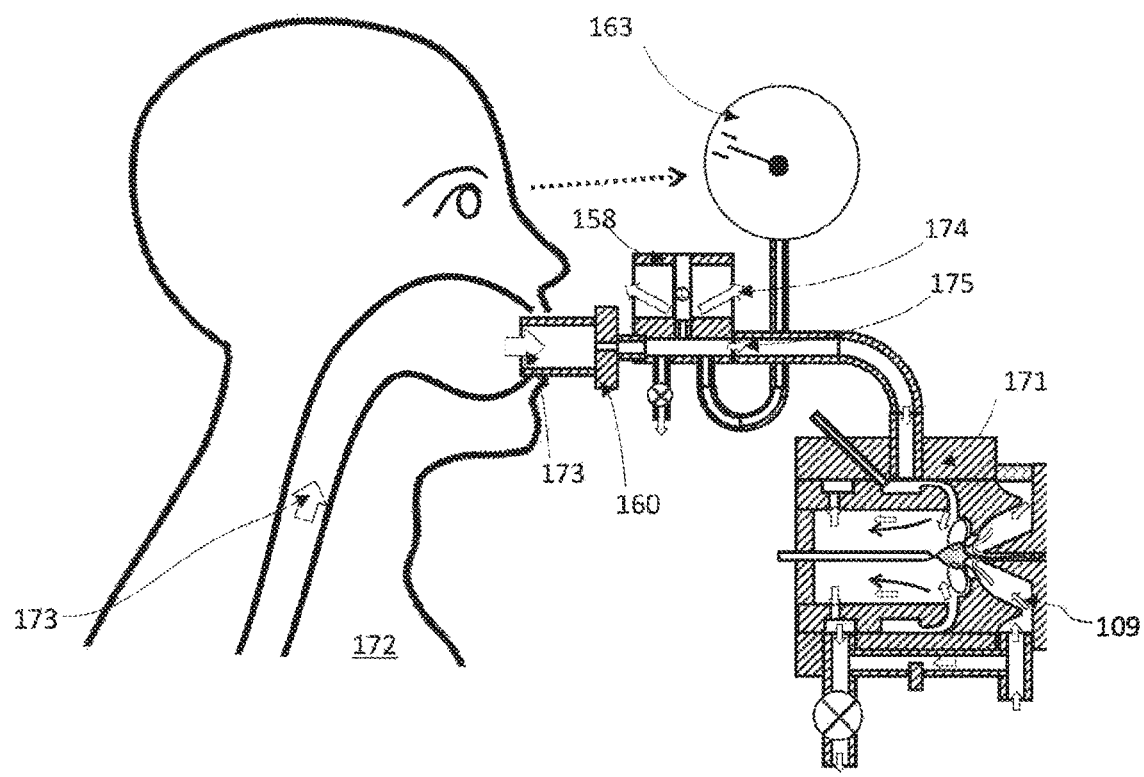
FIG. 14 illustrates the ionizer described in the present invention, further incorporating the regulator described in FIG. 12, when a person is exhaling into the system and the breath is being ionized and analyzed in real-time. This figure is a schematic sectional view.

FIG. 13 illustrates the ionizer of the present invention (171), further coupled with the breath regulator (158) herein described. When the person is not exhaling through the mouthpiece (160), the clean gas (109) flows from the ionizer (171) towards the regulator (158), sweeping any contamination within the regulator (158), and exiting only through the tunable restriction (165). FIG. 14 illustrates the same set-up when a person (172) is exhaling through the mouthpiece (160). The person (172) is requested to look at the pressure meter (163) and to aim at a fixed pressure. This helps to stabilize the pressure of operation, but humans are not particularly good at regulating the pressure of their breath. Especially, people with lung diseases, elderly people, and infants can have serious problems to provide steady pressure. When the person (172) exhales at approximately the requested pressure, exhaled breath (173) enters in the regulator (158) through the mouthpiece (160), the weight (168) is lifted and, as it slides up, it opens an aperture (170) for some exhaled breath (174) to exit to the room. When flow exhaled (173) by the person changes, the aperture (170) changes accordingly. If the person exhales more, more breath (174) is outputted through the aperture (170). If less breath is exhaled, then less breath is outputted. The result is that the pressure in the regulator (158) and the flow of breath passed (175) to the ionizer are automatically stabilized.

On the Use of Different Types of Primary Ion Sources and Analyzers:

The features of the present invention are preferably used when the source of charging ions is an electrospray. However, many of the improvements herein described are also applicable to other sources of charging ions. For the purpose of the present invention, other ion sources can be used. These sources that can be used in the present invention include, but are not limited to, glow discharges, corona discharges, dielectric barrier discharge ionization sources, photoionization sources, radioactive sources, and other sources of ions that produce charging ions (also termed reagent ions) that are used to charge sample molecules in the gas phase.

The description of this invention focuses on the interface between the new ionization source herein described and a Mass Spectrometer. However, the improvements herein described can be of use with other types of analyzers. For the purpose of the present invention, other analyzers can also be used. These analyzers that can be used in the present invention include, but are not limited to, Drift Tube Ion Mobility Spectrometers (DT-IMS), Differential Mobility Analyzers (DMA), Field Asymmetric Ion Mobility Spectrometers (FAIMS), Differential Mobility Spectrometers (DMS), Trap Ion Mobility Spectrometers (TIMS), Travelling Wave Ion Mobility Spectrometers (TWIMS), Transversal Modulation Ion Mobility Spectrometers (TMIMS), and other analyzers that classify and detect ions in the gas phase.

U.S. Patents and Applications Cited

U.S. Publication No. 2010/0264304 A1; Method for detecting volatile species of high molecular weight; Martinez-Lozano, Pablo, Fernandez de la Mora, Juan; Filed Apr. 4, 2007

U.S. Pat. No. 8,217,342 B2; Ionizer for vapor analysis decoupling the ionization region from the analyzer; Vidal-de-Miguel, Guillermo; Filed Jan. 13, 2010

U.S. Pat. No. 8,461,523 B2; Ionizer for vapor analysis decoupling the ionization region from the analyzer; Vidal-de-Miguel, Guillermo; Filed Jun. 8, 2012

U.S. Pat. No. 9,297,785 B2; Method for detecting atmospheric vapors at parts per quadrillion (ppq) concentrations; Vidal-de-Miguel, Guillermo; Zamora, Daoiz; Amo, Mario; Casado, Alejandro; Fernandez de la Mora, Gonzalo; and Fernandez de la Mora, Juan; Filed Jun. 25, 2012

Other Document Cited

[1] Lane, D. A., and Thomson, B. A., 1981, "Monitoring a Chlorine Spill from a Train Derailment," J. Air Pollut. Control Assoc., 31(2), pp. 122-127.

[2] Wu, C., Siems, W. F., and Hill, H. H., 2000, "Secondary Electrospray Ionization Ion Mobility Spectrometry/Mass Spectrometry of Illicit Drugs," Anal. Chem., 72(2), pp. 396-403.

[3] Martinez-Lozano, P., and de la Mora, J. F., 2007, "Electrospray ionization of volatiles in breath," Int. J. Mass Spectrom., 265(1), pp. 68-72.

[4] Martinez-Lozano, P., 2009, "Mass spectrometric study of cutaneous volatiles by secondary electrospray ionization," Int. J. Mass Spectrom., 282(3), pp. 128-132.

[5] Bregy, L., Muggier, A. R., Martinez-Lozano Sinues, P., Garcia-Gómez, D., Suter, Y., Belibasakis, G. N., Kohler, M., Schmidlin, P. R., and Zenobi, R., 2015, "Differentiation of oral bacteria in in vitro cultures and human saliva by secondary electrospray ionization—mass spectrometry," Sci. Rep., 5(October), p. 15163.

[6] Martinez-Lozano, P., Rus, J., Fernández de la Mora, G., Hernandez, M., and Fernandez de la Mora, J., 2009, "Secondary electrospray ionization (SESI) of ambient vapors for explosive detection at concentrations below parts per trillion," J. Am. Soc. Mass Spectrom., 20(2), pp. 287-94.

[7] Zhu, J., Bean, H. D., Jiménez-Diaz, J., and Hill, J. E., 2013, "Secondary electrospray ionization-mass spectrometry (SESI-MS) breathprinting of multiple bacterial lung pathogens, a mouse model study," J. Appl. Physiol., 114(11), pp. 1544-9.

[8] Fernandez de la Mora, J., 2011, "Ionization of vapor molecules by an electrospray cloud," Int. J. Mass Spectrom., 300(2-3), pp. 182-193.

[9] Vidal-De-Miguel, G., and Herrero, A., 2012, "Secondary electrospray ionization of complex vapor mixtures. Theoretical and experimental approach," J. Am. Soc. Mass Spectrom., 23(6), pp. 1085-1096.

[10] Martinez-Lozano Sinues, P., Criado, E., and Vidal, G., 2012, "Mechanistic study on the ionization of trace gases by an electrospray plume," Int. J. Mass Spectrom., 313, pp. 21-29.

[11] Garcia-Gómez, D., Martinez-Lozano Sinues, P., Barrios-Collado, C., Vidal-de-Miguel, G., Gaugg, M., and Zenobi, R., 2015, "Identification of 2-alkenals, 4-hydroxy-2-alkenals, and 4-hydroxy-2,6-alkadienals in exhaled breath condensate by UHPLC-HRMS and in breath by real-time HRMS.," Anal. Chem., 87(5), pp. 3087-93.

[12] Gaugg, M. T., Gomez, D. G., Barrios-Collado, C., Vidal-de-Miguel, G., Kohler, M., Zenobi, R., and Martinez-Lozano Sinues, P., 2016, "Expanding metabolite coverage of real-time breath analysis by coupling a universal secondary electrospray ionization source and high resolution mass spectrometry—a pilot study on tobacco smokers.," J. Breath Res., 10(1), p. 16010.

[13] Barrios-Collado, C., Garcia-Gómez, D., Zenobi, R., Vidal-de-Miguel, G., Ibáñez, A. J., and Martinez-Lozano Sinues, P., 2016, "Capturing in Vivo Plant Metabolism by Real-Time Analysis of Low to High Molecular Weight Volatiles," Anal. Chem., 88(4), pp. 2406-2412.

[14] Garcia-Gómez, D., Gaisl, T., Barrios-Collado, C., Vidal-de-Miguel, G., Kohler, M., and Zenobi, R., 2016, "Real-Time Chemical Analysis of E-Cigarette Aerosols By Means Of Secondary Electrospray Ionization Mass Spectrometry," Chem.—A Eur. J., 22(7), pp. 2452-2457.

[15] Vidal-de-Miguel, G., Macia, M., Pinacho, P., and Blanco, J., 2012, "Low-sample flow secondary electrospray ionization: improving vapor ionization efficiency.," Anal. Chem., 84(20), pp. 8475-9.

[16] Barrios-Collado, C., Vidal-de-Miguel, G., and Martinez-Lozano Sinues, P., 2015, "Numerical Modeling and Experimental Validation of a Universal Secondary Electrospray Ionization Source for Mass Spectrometric Gas Analysis in Real-Time," Sensors Actuators B Chem., 223, pp. 217-225.

What is claimed:

1. An apparatus to ionize molecules at atmospheric pressure carried by a flow of sample gas, and to transfer the resulting ions into the inlet of an analyzer for analysis, said apparatus comprising:
    an ionization chamber comprising an inlet to introduce said flow of sample gas, said flow of sample gas carrying said molecules, and a source of charging ions, wherein said molecules react with said charging ions to form sample ions in an ionization region,
    a flow deflector arranged between said source of charging ions and the inlet of said analyzer, said flow deflector comprising an orifice aligned with said inlet of said analyzer, wherein said flow deflector includes opposing first and second faces, said first face facing towards said ionization chamber, a groove being formed in said first face which encircles said orifice, said groove terminating at a corner, away from said orifice, with high curvature such that a toroidal vortex formed about said ionization region is maintained in a fixed position relative thereto, and,
    an inlet for clean gas located between said flow deflector and said inlet of said analyzer,
    wherein a flow of clean gas is introduced through said inlet to flow along said second face of said flow deflector, towards said orifice, and into said inlet of said analyzer,
    wherein an interface is defined between said flow of clean gas and said flow of sample gas in said orifice,
    wherein said sample ions pass through said interface in said orifice, and said flow of clean gas guides said sample ions into said inlet of said analyzer.

2. The apparatus of claim 1, wherein:
    said source of charging ions accelerates said charging ions substantially towards said orifice, inducing said toroidal vortex, and,
    said sample gas is introduced through an annular opening coaxial with said orifice in a position relative to said toroidal vortex where the velocity induced by said toroidal vortex is radial and towards a center of said toroidal vortex, such that said toroidal vortex sucks said sample gas towards the center of said toroidal vortex and the ionization region.

3. The apparatus of claim 1, wherein said flow deflector includes an edge bounding said orifice, the edge being blunted, causing a second toroidal vortex to be formed downstream of said edge, said second toroidal vortex reducing shear stress between said flow of sample gas and said clean gas in said orifice.

4. The apparatus of claim 1, wherein:
said sample gas is introduced through an annular slit coaxial with said orifice located between said source of charging ions and said orifice,
a fraction of said flow of sample gas is sucked by said toroidal vortex, and
the remaining fraction of said flow of sample gas is outputted through a secondary outlet located behind said source of charging ions, carrying molecules released from said ionization chamber away from the ionization region.

5. Thea apparatus of claim 4, further comprising:
an exhaust that collects said remaining fraction of said flow of sample gas, and
a flow distributor that connects said exhaust and said inlet for clean gas.

6. The apparatus of claim 4, wherein:
said source of charging ions is an electrospray,
said source of charging ions further includes a cooling inlet and a cooling outlet coaxial with said electrospray,
wherein, a flow of cooling gas is introduced through said cooling inlet and outputted through said cooling outlet,
said ionization region is heated at a temperature above the boiling point of said electrospray, and
said electrospray is cooled to a temperature below the boiling point of said electrospray.

7. The apparatus of claim 1, further comprising a secondary inlet to introduce a flow of liquid at said inlet.

8. The apparatus of claim 1, wherein said ionization chamber and said flow deflector are assembled in two parts:
a main part that comprises said flow deflector, said inlet, said inlet for clean gas, and a housing; and
a second part that comprises said source of charging ions, and said set of charging ions, wherein said second part is housed in said housing of said main part, and
wherein a gap is defined between said main part and said second part which defines a set of annular cavities that distribute flows circumferentially.

9. The apparatus of claim 1, further comprising a regulator comprising:
a mouthpiece inlet to connect a mouthpiece;
an outlet that is connected with said inlet to introduce said flow of sample gas;
an orifice that connects with a pressure meter;
a second orifice that communicates with the atmosphere through a restriction;
an opening;
means to regulate flow outputted though said opening so that flow passed through said outlet that communicates with said inlet to introduce said flow of sample gas is stabilized against variations of flow introduced through said mouthpiece inlet.

10. A method to determine the chemical composition of breath exhaled by a person in real time, said method comprising:
providing an analyzer to analyze ions, wherein said analyzer comprises an inlet to receive said ions,
providing an apparatus to ionize molecules at atmospheric pressure carried by a flow of sample gas, and to transfer the resulting ions into said inlet of said analyzer, said apparatus having an inlet to introduce said flow of sample gas, a second inlet to introduce a flow of clean gas, and an exhaust,
providing a regulator comprising a mouthpiece inlet, an outlet that is connected with said inlet to introduce said flow of sample gas, an orifice that connects with a pressure meter, an opening, and means to regulate the flow outputted though said opening so that flow passed through said outlet that communicates with said inlet to introduce said flow of sample gas is stabilized against variations of the flow introduced through said mouthpiece inlet,
connecting a mouthpiece to said mouthpiece inlet,
introducing a continuous flow of clean gas through said second inlet, wherein a fraction of said clean gas flows through said inlet of said analyzer, another fraction of said clean gas flows into said ionizer and said regulator and the remaining clean gas is outputted through said exhaust when no gas is introduced through said mouthpiece,
positioning said mouthpiece adjacent a mouth of said person to capture breath exhaled by said person,
having said person exhaling breath into said mouthpiece at a pressure above a predefined pressure, wherein said predefined pressure causes a fraction of said exhaled breath to flow trough said regulator, into said apparatus to ionize molecules,
measuring and recording the signals produced by said analyzer to determine the chemical composition of the breath exhaled by the person.

\* \* \* \* \*